April 19, 1960   J. A. RYDBERG   2,932,845
MOBILE PNEUMATIC CLEANING DEVICE
Filed April 3, 1957   7 Sheets-Sheet 1

INVENTOR
JOHN ANDERS RYDBERG

April 19, 1960   J. A. RYDBERG   2,932,845
MOBILE PNEUMATIC CLEANING DEVICE
Filed April 3, 1957   7 Sheets-Sheet 6

John Anders Rydberg

April 19, 1960   J. A. RYDBERG   2,932,845
MOBILE PNEUMATIC CLEANING DEVICE
Filed April 3, 1957   7 Sheets-Sheet 7

United States Patent Office 2,932,845
Patented Apr. 19, 1960

2,932,845

MOBILE PNEUMATIC CLEANING DEVICE

John Anders Rydberg, Stockholm, Sweden, assignor to AB Asbrink & Co., Malmo, Sweden, a corporation of Sweden Application April 3, 1957, Serial No. 650,521

13 Claims. (Cl. 15—346)

The present invention relates to mobile pneumatic cleaning devices adapted to be moved over a surface such as a street, a roadway, an airfield runway, a factory or hangar floor, or like surface, for removing fine as well as coarse sweepings such as chips, sand, paper, pieces of wood and metal and such other materials as might litter surfaces of the kind referred to. This application is a continuation in part of my copending applications Serial No. 281,411, filed April 9, 1952, now abandoned, and Serial No. 544,333, filed November 1, 1955, also now abandoned.

The mobile pneumatic cleaning device according to the invention is of the type comprising a nozzle unit including suction nozzle means having a continuous slot-like inlet opening, and blast nozzle means having a continuous slot-like outlet opening completely encircling said inlet opening. Air is blown through said blast nozzle means against said surface and is thus caused to sweep along the surface to entrain or carry along the objects and articles to be removed from said surface, into the suction nozzle means.

When vacuum cleaning in the conventional manner, dust is removed from a floor or other surface by means of a nozzle moved close to the surface to be cleaned, so that a minor gap or space only is maintained between the nozzle edges surrounding the nozzle opening, and the surface. When more or less uneven surfaces as those mentioned above are to be cleaned by a mobile pneumatic cleaning device of the type referred to the nozzle unit necessarily must be maintained at a greater distance, say 45–125 mm., from the surface to be cleaned for otherwise difficulties will be encountered due to the unevenness of said surface and the coarseness of some of the matter to be removed therefrom. However, the speed of the air moving close to said surface rapidly decreases as the distance between the suction nozzle and the surface increases. Now, due to the relatively large distance between the nozzle unit and the surface in a device of the kind described air must be drawn in large quantities per time unit into the suction nozzle means in order to maintain the speed of the air flowing over the surface to be cleaned from the air blast nozzle means to the suction nozzle means at the very high value necessary for removing not only dust but also relatively coarse and heavy things from said surface. Thus, the output power of a fan transporting the air between the suction and blast nozzle means will be very large. Also, a dust separator of tremendous size would be required for separating the dust from the air sucked in. In practice the large size of fan and separator necessitates the mobile cleaning device to be large and ungainly and also causes the investment and operating cost for said device to be very high. Therefore, it is desired to find a way for increasing the cleaning efficiency of the air stream forced from the air blast nozzle means to the suction nozzle means without increasing the output power of the fan producing said air stream.

The main object of this invention is thus to solve this problem in a way satisfactory from a practical viewpoint, and according to the invention this has been done by providing a mobile pneumatic cleaning device of the type referred to above comprising a nozzle unit, said nozzle unit including suction nozzle means having a slot-like inlet opening, blast nozzle means having a continuous slot-like outlet opening completely encircling said inlet opening, and spacing means between said inlet opening and said outlet opening, said slot-like outlet opening consisting of two straight portions substantially parallel to said inlet opening and disposed one on each side thereof and two arcuate portions interconnecting said parallel portions at each end of said slot-like inlet opening and being of less width than said straight portions, and further comprising means mounting said nozzle unit spaced above said surface with said nozzle means directed towards said surface, said blast nozzle means being directed inwardly against said suction nozzle means in oblique angle to said surface, said spacing means comprising a wall providing a top boundary of continuous annular space between said openings, said space being open downwardly and accommodating a vortex action of air forced from said blast nozzle means.

In the nozzle unit according to the invention the air performing said vortex action in said continuous annular space between the nozzle openings may be considered to form a rotating "air brush" of closed annular form, said "air brush" encircling said suction nozzle opening and sweeping articles on the surface to be cleaned against and into the suction nozzle means.

Further and other objects will be set forth in the following description of two practical embodiments of the invention with reference to the accompanying drawings, in which.

Figure 1:
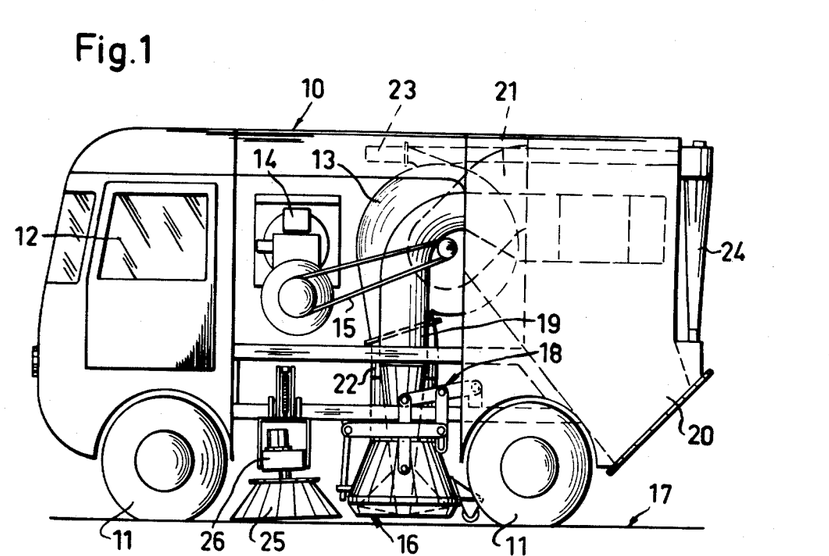
Fig. 1 is a side elevational view of a pneumatic cleaning vehicle according to the invention, the side panels of the vehicle body being removed for showing the cleaning device.
Figure 2:
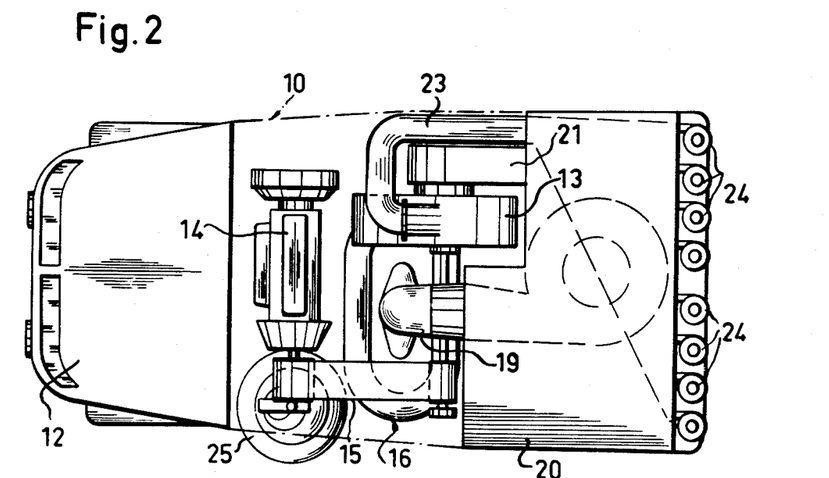
Fig. 2 is a plan view of the vehicle shown in Fig. 1.

Referring to Figs. 1 and 2 in the drawings there is shown a motor vehicle 10 provided with wheels 11 and a driver's cabin 12. In the motor vehicle there is mounted a pneumatic cleaning device comprising a fan 13 of the centrifugal type and an internal combustion engine 14 connected to fan 13 by a pulley and belt transmission 15 to drive said fan. A nozzle unit 16, to be described in more detail later, for cleaning the surface 17 on which the motor vehicle 10 moves, is mounted on the vehicle by mounting means 18, also to be described in more detail later. The nozzle unit 16 comprises air blast nozzle means and suction nozzle means, said suction nozzle means being connected by a conduit 19 to the inlet of a separator 20 which may be of any suitable known type and may consist of a cyclone. The outlet of separator 20 is connected to a conduit 21 in turn connected to the axial inlet of fan 13. The main part of the air transported by fan 13 is discharged through a conduit 22 connected at one end to the outlet of fan 13 and at the other end to the blast nozzle means of nozzle unit 16. A further conduit 23 of considerably smaller size than that of conduit 22 is connected at one end to the outlet of fan 13, the other end of said conduit 23 communicating with the atmosphere through a plurality of air filters or other dust separators 24 of any suitable design. Thus, air is drawn by fan 13 when driven by engine 14, from the suction nozzle means of nozzle unit 16 through the separator 20 where articles removed by the air from the surface 17 are separated and the air is roughly purified. From the fan the main part of the air is led to the nozzle unit 16 and a minor part is discharged into the atmosphere through filters or separators 24 highly purifying the air from the fan. Air thus discharged from the air circulating system described is substituted by air drawn into the system from the atmosphere at nozzle unit 16 or at any other point in the circulation path, and the air circulating in the system is thus successively renewed.

Ahead of nozzle unit 16 as seen in the direction of movement of the motor vehicle 10 and at one side thereof there is mounted a rotatable brush or broom 25 rotated by an electric, hydraulic or other motor 26. The brush or broom is used for sweeping liter out of the gutter of a street into the operating area of nozzle unit 16 whereby said nozzle unit may be moved by the motor vehicle along the gutter at a distance therefrom still cleaning the gutter, and thus there is no risk for nozzle unit 16 being damaged by impact against the gutter.

Figure 3:
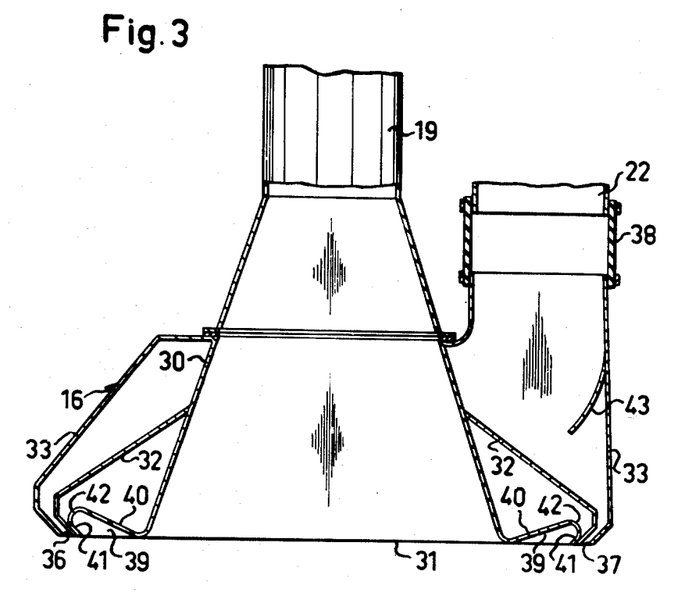
Fig. 3 is an enlarged sectional view taken axially of the nozzle unit and the pressure and suction conduits connected thereto.
Figure 4:
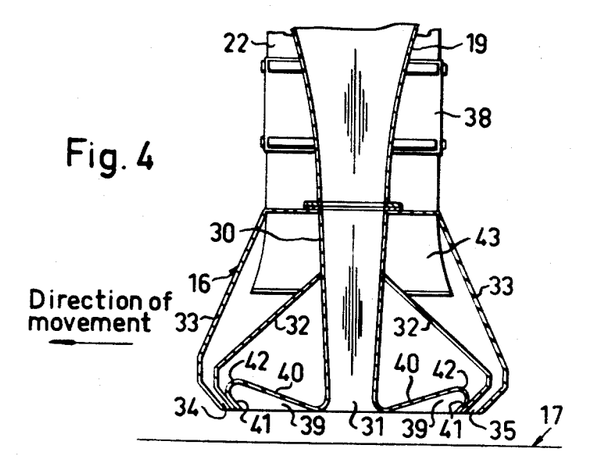
Fig. 4 is a sectional view taken axially of the nozzle unit and the suction conduit connected thereto at right angles to the sectional view of Fig. 3.
Figure 5:
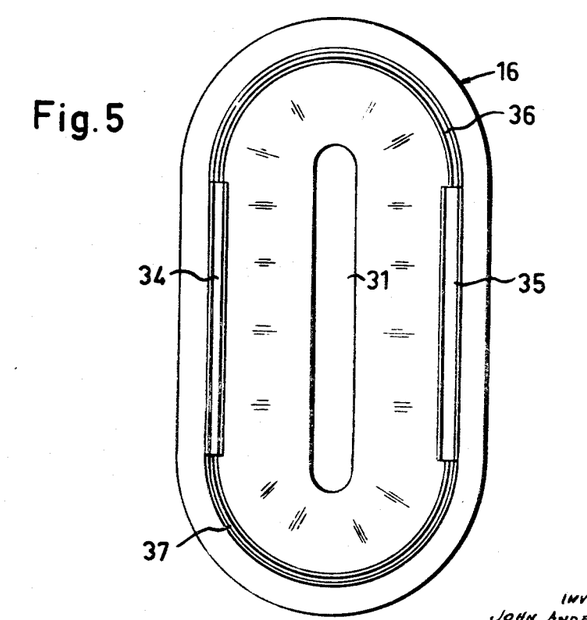
Fig. 5 is a plan view of the underside of the nozzle unit of Figs. 3 and 4.

Referring now to Figs. 3–5 in the drawings, nozzle unit 16 will be described in more detail. The nozzle unit includes a wall 30 forming said suction nozzle means having a slot-like inlet opening 31. Opening 31 faces downwardly and extends at right angles to the longitudinal direction of the motor vehicle 10, that is at right angles to the direction of movement of said vehicle. The suction nozzle wall 30 is rigidly connected to said suction conduit 19 in any conventional manner and is surrounded by the blast nozzle means formed by inner and outer walls 32 and 33, respectively, and having a slot-like outlet opening 34, 35, 36, 37 which is approximately coplanar with inlet opening 31. Said outlet opening encircling inlet opening 31 at a distance therefrom is arranged to direct the ejected air in the form of a shroud or curtain obliquely downwardly towards the vertical projection of the inlet opening 31 on the surface 17 to be cleaned. The outlet opening consists of two straight portions, a forward one 34 and a rear one 35, disposed ahead of and behind the inlet opening 31, respectively, as seen in the direction of movement of the vehicle marked with an arrow in Fig. 4. Said straight portions 34 and 35 are of approximately the same length as the length of inlet opening 31 and are parallel thereto. The outlet opening further comprises two semicircular portions 36 and 37 disposed one at each end of the inlet opening 31 and interconnecting said straight portions 34 and 35. The semicircular portions 36, 37 have a width that is smaller than that of the straight portions 34, 35, and preferably the width of said forward straight portion 34 is smaller than that of the rear straight portion 35 in order that said latter portion may eject more air and preferably 20 percent more air than the forward straight portion 34, which has been found desirable for an effective cleaning. In one practical embodiment of the invention the portions 34 and 35 had a width of 18 and 22 mm. respectively. The semicircular portions had a width amounting to ⅔ of that of the forward portion 34, i.e. 12 mm. The blast nozzle means formed by walls 32 and 33 is connected to conduit 22 by a flexible tube 38 fixed to wall 33 and conduit 22 in any conventional manner.

Between the inlet opening 31 and the outlet opening 34, 35, 36, 37 encircling the inlet opening there is a space 39, said space being upwardly closed and downwardly open and arching upwardly over and between the inlet and outlet openings. Space 39 is bounded by a spacing wall between the inlet and outlet openings, comprising two outwardly inclined wall portions, an inner one 40 and an outer one 41, the inner wall portion 40 being more inclined outwardly than is the outer wall portion 41 and merging at the top into said latter wall portion through a smoothly curved wall portion 42. The wall portions 40, 41 and 42 are integral with wall 30 forming said suction nozzle means and in fact constitute an extension of said wall, the outer end of said extension being connected to the inner wall 32 of the blast nozzle means, and the inner end joining the wall 30 of the suction nozzle means on a curved line.

Space 39 accommodates the vortex action of the air ejected from the outlet opening 34, 35, 36, 37 as explained above. The air thus ejected creates a swirling effect and in fact acts as an annular rotating "air brush" encircling the inlet opening 31 and tending to whirl the litter and other articles to be removed from surface 17 inwardly toward the inlet opening 31 and to increase the velocity of the air stream close to said surface for a given power output of fan 13. This "air brush" may be considered to act as an artificial downward extension of the suction nozzle means. By arranging the outlet opening with semicircular portions interconnecting said straight portions and being narrower than said straight portions, all blowing air is sucked up again through the suction nozzle means and undesirable escape of ejected air to the atmosphere is prevented, ensuring an undisturbed regular vortex action of the air in the vortex space 39 to be achieved.

As shown in Figs. 3 and 4 a deflector plate 43 may be mounted in the blast nozzle means for a uniform distribution of the air from conduit 22 to all parts of the nozzle.

The mounting means 18 for nozzle unit 16 is shown in more detail in Fig. 6 and shall now be described. Two horizontal beams forming part of or being connected to the vehicle body and extending in the longitudinal direction of the vehicle, one of which is shown at 50 in Fig. 6 and the other one being disposed behind beam 50 and spaced therefrom in the transverse direction of the vehicle, are provided each with two brackets 51 and 52, respectively; said brackets forming bearings for two shafts 53 and 54, respectively, extending parallel to each other transversely of the vehicle. At each end of shaft 53 there is nonrotatably fixed an arm 55 and between the ends of said shaft there is fixed an arm 56 at right angles to the arms 55. Two or more arms 56 may be provided. Arm 56 is slidably guided in a sleeve 57 on nozzle unit 16 near the underside thereof. At each end of the other shaft 54 there is nonrotatably fixed an arm 58. This arm is connected to the upper end of nozzle unit 16 by a link 59 pivoted at 60 and 61 to the arm 58 and the nozzle unit 16, respectively. Between the pivot point 60 and the shaft 54, one end of a further link 62 is pivoted at 63 to arm 58, the other end of said further link being pivotally connected to arm 55 by a lost motion connexion consisting of an elongated slot 64 in link 62 and a pin 65 fixed on arm 55 and slidably guided in said slot. An adjustable abutment screw 66 is secured on beam 50 shown in the drawings for engagement with the arm 58 to limit swinging movement thereof in the downward direction. The lost motion connexion 64, 65 is arranged such that the pin 65 is at or near the upper end of the slot 64 when the arm 58 engages the abutment screw 66 with the underside of the nozzle unit 16 at the recommended minimum distance from the surface 17 to be cleaned and the longitudinal axis of the nozzle unit extending substantially vertically.

The linkage at one side of the nozzle unit 16 only is connected to means for balancing and lifting the nozzle unit. A helical tension spring 67 is fixed between the free end of the arm 58 and a beam 68 constituting part of or being connected to the motor vehicle body, said spring being for counterbalancing the load on the mounting means. For lifting the nozzle unit a single-acting hydraulic ram 69 is pivoted to beam 68 at one end and is coupled by a chain 70 at the other end to the arm 58 between pivot point 60 and the free end of said arm.

In order to allow the movements of nozzle unit 16 the conduit 22 is connected to said unit by the flexible tube 38. Also with respect to the conduit 19 provisions are made for this purpose. Said conduit is rigidly connected to nozzle unit 16; the connexion between the conduit 19 and the separator 20, however, is constructed for permitting the necessary movements of the nozzle unit 16, and as shown in Fig. 6 the conduit 19 is connected to the separator 20 by a flexible tube 71 which is fixed by conventional means to the conduit 19 at one end and to a collar 72 bolted to the separator 20 at the other end. The collar 72 is rectangular in shape and so is the end of the conduit 19 connnected to the flexible tube 71, the conduit over the major part of its length, however, being circular in cross section. For guiding the conduit 19 during the movements of the nozzle unit 16 and for preventing said conduit from performing uncontrolled movements there is disposed between the collar 72 and the conduit 19 inside the flexible tube 71 a plate 73 which is connected to the collar 72 and the conduit 19, respectively, at the upper edges thereof by hinges 74 and 75, respectively. Besides guiding the conduit 19 this plate prevents the flexible tube 71 from being drawn inwards through the suction force provided by fan 13. For this purpose there are also arranged two plates at opposite sides of the conduit 19 on the inner surface thereof extending into the flexible tube 71, one of which is shown at 76, each of said plates being provided with a smoothly curved circular button 77 on the surface facing outwardly, said button engaging the inner surface of the flexible tube 71, thereby preventing said tube from being worn by plate 76.

The ram 69 is connectible to a source of pressure fluid in a manner well-known in the art for raising the arms 58 and hence the nozzle unit 16 through links 59 with sleeve 57 sliding along arm 56 and with pin 65 sliding in slot 64 and without swinging movement being imparted to arms 55 and 56. For lowering the nozzle unit fluid is drained off the ram 69, the nozzle unit being slowly drawn downwardly against the surface 17 by the force provided by the suction in the suction nozzle means until the abutment screw 66 engages arm 58.

The mounting means 18 described also provides a safety feature for preventing damage to nozzle unit 16 at impact on a large stone or other obstruction in the path of movement of the nozzle unit when the motor vehicle 10 is moving along the surface 17 to be cleaned. When striking an obstruction at its front side the nozzle unit is swung rearwardly in the longitudinal direction of the motor vehicle, links 59 and the flexible connections of conduits 19 and 22 allowing such swinging movement of the nozzle unit. During said movement of the nozzle unit arms 55 and 56 are rotated counterclockwise as seen in Fig. 6 and thus the pin on arm 55 engages the end of the slot 64 if not already in engagement therewith, thereby causing arms 58 to be raised through links 62. The nozzle unit 16 is thereby lifted through the links 59, and due to the fact that the nozzle unit is counterbalanced by spring 67 the nozzle unit will slowly be drawn down against the surface 17 again by suction force developed in the suction nozzle means. Thus, it may be said that the nozzle unit when striking an obstruction will "float" over said obstruction. Preferably, the linkage system provides a lifting movement of say 3 cm. for a rearward displacement of 1 cm. of the nozzle unit 16.

Figure 6:
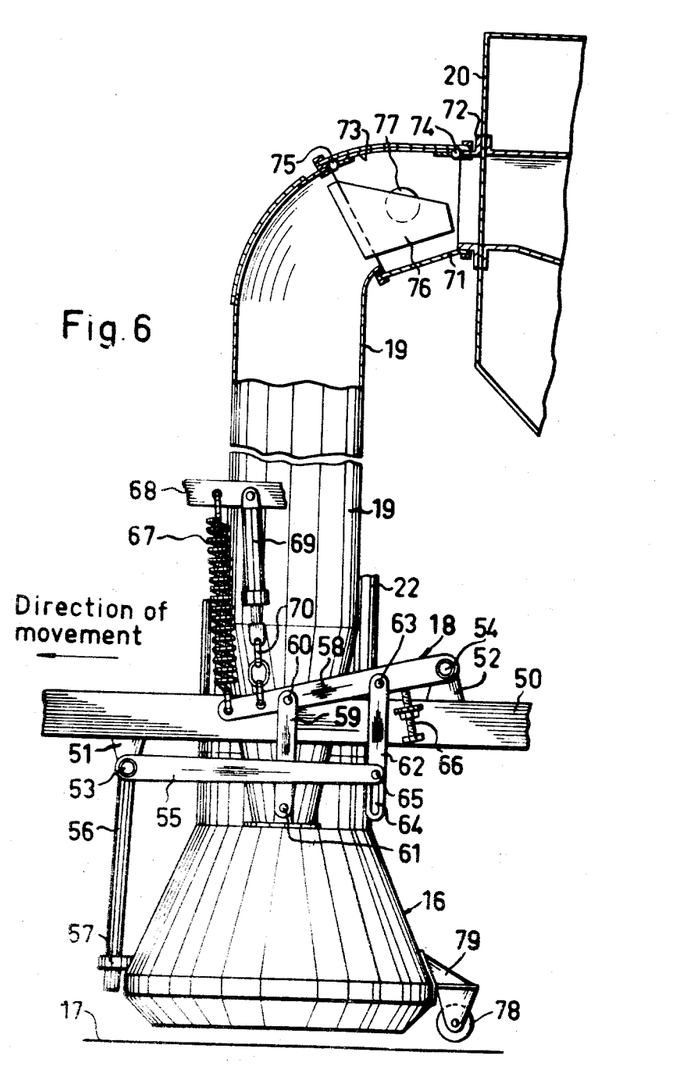
Fig. 6 is an elevational view of the nozzle unit and the suction conduit connected thereto, part of the suction conduit and a separator connected thereto being shown in section axially of the suction conduit.

As shown in Fig. 6 a roller 78 is rotatably mounted on nozzle unit 16 by a bracket 79 fixed to the nozzle unit in the central region of the transverse dimension of said nozzle unit. This roller has for its purpose to space the nozzle unit sufficiently from the surface 17 to be cleaned when the motor vehicle is moving along a street that is cambered as is usually the case. Without this roller the surface 17 in that case may come close to the nozzle unit in or near the longitudinal centre plane of the vehicle and sometimes may touch and damage said unit. By engaging and rolling along the surface 17 the roller 78 ensures that a minimum distance is always maintained between said surface and the nozzle unit.

Figure 7:
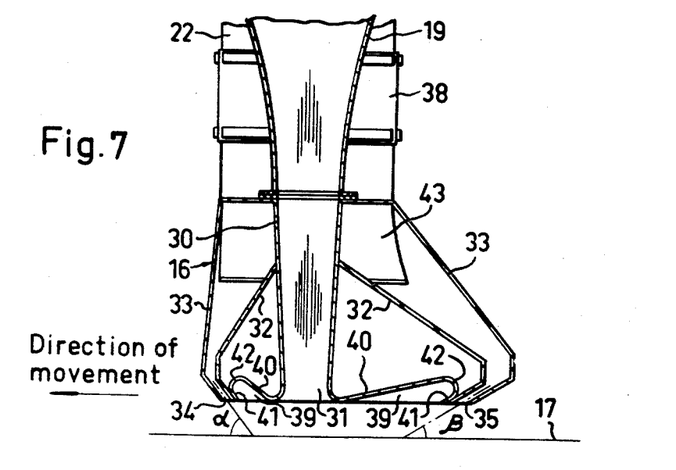
Fig. 7 is a sectional view similar to Fig. 3 of a modified nozzle unit.
Figure 8:
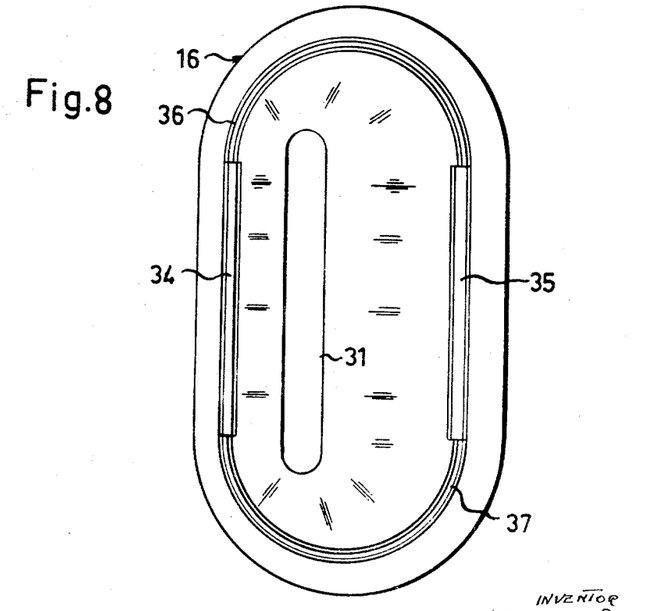
Fig. 8 is a plan view of the underside of the nozzle unit of Fig. 7.

Referring now to Figs. 7 and 8 in the drawings there is shown a modification of the nozzle unit 16 by which the results secured may be improved in a substantial number of cases. As in the embodiment previously described the nozzle unit includes a slot-like outlet opening encircling a slot-like inlet opening 31 and consisting of two straight portions, a forward one 34 and a rear one 35, of which the forward portion 34 is of smaller width than the rear portion 35, and of two semicircular portions 36 and 37 interconnecting said straight portions 34 and 35 and being of a still smaller width. However, the forward straight portion 34 is closer to the suction nozzle opening 31 than the rear straight portion 35. The effect achieved by this arrangement is that the air ejected from the rear portion 35 will have more time to accelerate the objects and particles to be picked up from the surface 17 to such a velocity that they will be maintained in suspension in and be carried along with the air stream passing into the suction nozzle. The acceleration of these objects to such a velocity naturally requires a period of time and hence the greater the speed at which the nozzle unit is to be moved over the surface to be cleaned, the greater should be the distance between the rear portion 35 of the outlet opening and the inlet opening 31. In other words, the objects and particles to be removed must be exposed to the forwardly directed air stream from the rear portion 35 for a sufficient period of time to be accelerated into such speed that they will be carried along by the air stream into the inlet opening 31. It is, of course, desired to allow for as high a travelling speed as possible of the motor vehicle.

As also shown in Figs. 7 and 8 of the drawings, the part of the blast nozzle means forming the forward portion 34 and the part of the blast nozzle means forming the rear portion 35 are arranged in differently steep angles $\alpha$ and $\beta$, respectively, to the surface to be cleaned, the angle $\alpha$ being steeper than the angle $\beta$. In practice, optimal efficiency with regard to the cleaning of the surface 17 has been achieved with $\alpha=50-60°$ and $\beta=30-50°$.

Referring to the modifications shown in Figures 9 to 13, the reference numeral 1 indicates generally the suction nozzle, and 2 the blast nozzle, which are substantially of the same construction as that of the unit shown in Figures 3, 4 and 5. The reference numeral 3 indicates a fan assembly similar to the fan 13 of Figure 1 to which the blast nozzles 2 are connected. The suction nozzle 1 is connected to the suction side of the fan 3 through the cyclone 4.

Figure 9:
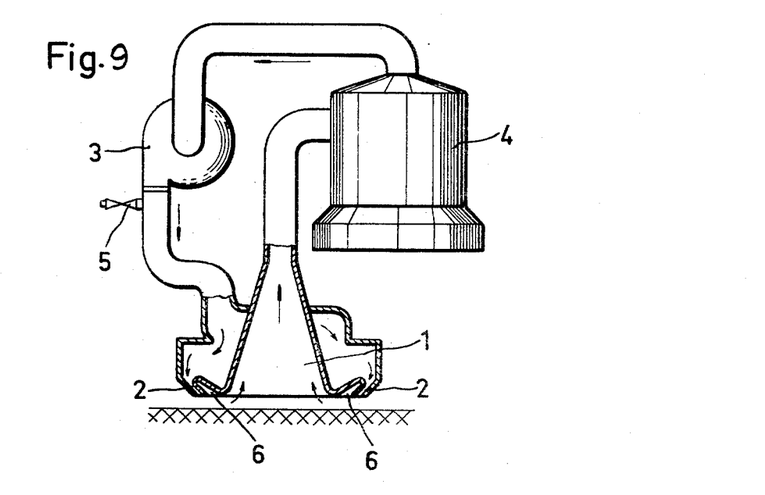
Figure 9 is a diagrammatic vertical longitudinal section of a nozzle unit of a modification shown in my co-pending application Ser. No. 544,333.
Figure 10:
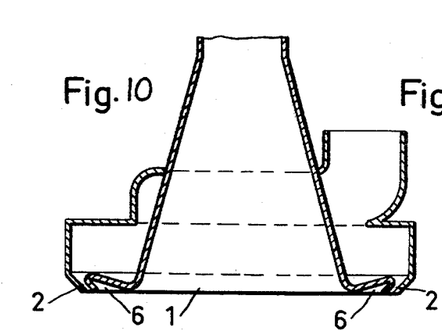
Figures 10 and 11 are a vertical longitudinal section and a plan view, respectively, of the nozzle unit shown in Figure 9 drawn to a larger scale.
Figure 11:
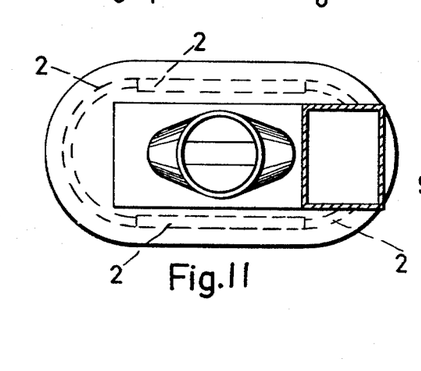
Figure 12:
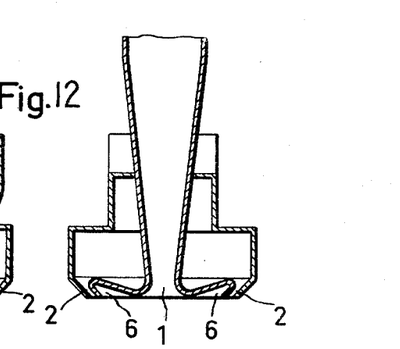
Figure 12 is a vertical cross-section thereof and Figure 13 is a partial sectional view of the nozzle shown in Figure 12 drawn to a larger scale.
Figure 13:
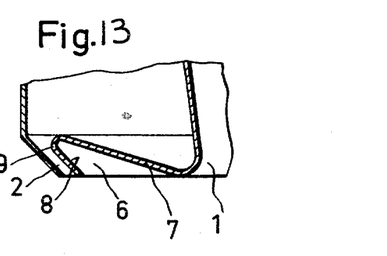

As indicated, it is desirable to reduce as much as possible the quantity of added air drawn in by the suction nozzle from outside the apparatus and limit the circulated air to the air blown out through the blast nozzles 2. However, some added air is usually drawn in, and this added air may be bled from the apparatus through the outlet 5 on the pressure side of the fan.

The annular space 6 corresponding to space 39 of

Figures 4 and 7 is defined by the walls 7 and 8 and the curved member 9 which in all substantial respects are similar in construction to the members 40, 41 and 42 of Figures 4 and 7.

Figures 14, 15:
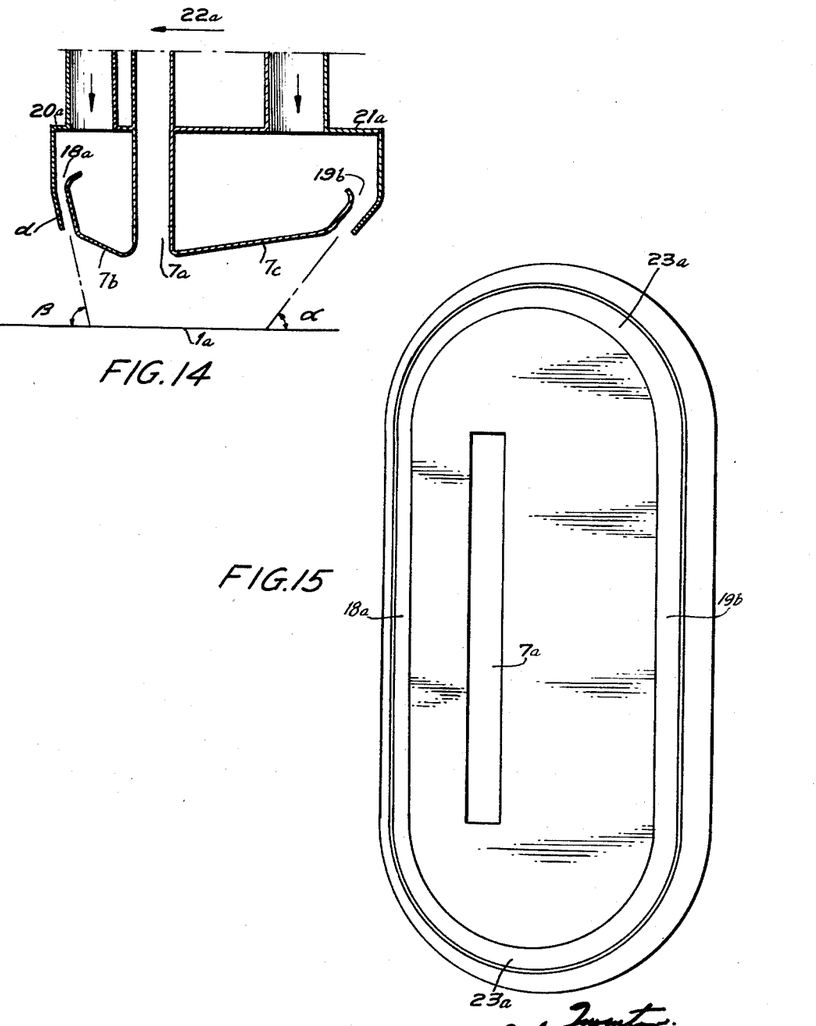
Figure 14 is a longitudinal section of a modification shown in my co-pending application Ser. No. 281,411
Figure 15 shows the nozzle unit of Figure 14 as seen from below.

The modification shown in Figures 14 and 15, is similar to the embodiment shown in Figures 7 and 8. The blast nozzle 18a, which is farthest to the front in relation to the suction nozzle 7a, is comparatively narrow and relatively close to the suction nozzle 7a and forms a relatively steep angle β with the ground surface 1a. The rear air blast nozzle 19b is somewhat wider than air blast 18a and forms a comparatively flat angle α with the ground surface.

This distributing chambers for the blast nozzles 18a and 19b are designated at 20a and 21a, and it will be observed that the chamber 21a supplying air for the wider nozzle 19b is of greater capacity than the chamber 20a supplying air for the narrower nozzle 18a.

It will be noted that in the modification shown in Figure 14, the orifice of the suction nozzle 7a is located closer to the road surface than the blast nozzle outlets 18a and 19b thus providing upwardly inclined walls 7b and 7c extending from the suction nozzle orifice to the inner sides of the blast nozzle outlets 18a and 19b respectively. This results in a space defined by the veil or curtain of air force from the air outlets 18a and 19b and at the top by the walls 7b. Within this air space the air flow can whirl developing a vortex action and tending to sweep picked up dirt and particles toward and into the suction nozzle.

The nozzle unit shown in Figure 15 includes a continuous, encircling air blast slot, the front and rear parts 18a and 19b of which are united by the arcuate parts designated at 23a.

Having described several embodiments of the invention, it is obvious that the same is not to be considered restricted thereto. Thus, it may be mentioned that the pneumatic cleaning device instead of being mounted in a motor vehicle may be mounted in a vehicle without any propulsion means but being adapted to be coupled to a tractor or the like. Therefore, the invention is broad enough to cover all structures coming within the scope of the annexed claims.

What I claim and desire to secure by Letters Patent is:

1. A mobile pneumatic cleaning device adapted to be moved over a surface to remove loose material therefrom, comprising a nozzle unit, said nozzle unit including suction nozzle means having a slot-like inlet opening, blast nozzle means having a continuous slot-like outlet opening completely encircling said inlet opening, and spacing means between said inlet opening and said outlet opening, said slot-like outlet opening consisting of two straight portions substantially parallel to said inlet opening and disposed one on each side thereof and two arcuate portions interconnecting said straight portions at each end of said slot-like inlet opening, said nozzle unit being spaced above said surface with said nozzle means directed towards said surface, said blast nozzle means being directed inwardly toward said suction nozzle means in oblique angle to said surface, said spacing means comprising a wall providing a top boundary of a continuous annular space between said openings, said space being open downwardly and accommodating a vortex action of air forced from said blast nozzle means.

2. A mobile pneumatic cleaning device as claimed in claim 1, in which said wall comprises two inclined wall portions one of which extends upwardly and outwardly from said inlet opening and the other extends upwardly and outwardly from said outlet opening, and a curved wall portion interconnecting said inclined wall portions.

3. A mobile pneumatic cleaning device as claimed in claim 2, in which said one upwardly and outwardly extending wall portion is joined to said suction nozzle means on a curved line.

4. A mobile pneumatic cleaning device as claimed in claim 2, in which said one upwardly and outwardly extending wall portion is at a greater angle to the vertical than said other upwardly and outwardly extending wall portion.

5. A mobile pneumatic cleaning device as claimed in claim 1, in which a forward one of said straight portions, disposed ahead of said inlet opening as seen in the moving direction of said cleaning device is narrower than a rear one of said straight portions, disposed behind said inlet opening as seen in said direction.

6. A mobile pneumatic cleaning device as claimed in claim 1, in which a forward one of said straight portions disposed ahead of said inlet opening as seen in the moving direction of said cleaning device is spaced a shorter distance from said inlet opening as seen in said direction than a rear one of said straight portions, disposed behind said inlet opening as seen in said direction.

7. A mobile pneumatic cleaning device as claimed in claim 6, in which said forward straight portion is narrower than said rear straight portion.

8. A mobile pneumatic cleaning device as claimed in claim 7, in which the part of the blast nozzle means forming said forward straight portion is inclined to the surface to be cleaned at a steeper angle than is the part of the blast nozzle means forming said rear straight portion.

9. A suction and blast nozzle unit for cleaning streets and other surfaces by suction and air blast, comprising a suction nozzle provided with a downwardly facing orifice in the form of an elongated slot and an annular air blast nozzle having a slot-like orifice encircling said suction nozzle and spaced therefrom directing an air blast downwardly in the form of a veil obliquely toward the suction nozzle orifice on the surface to be cleaned, means defining an annular space between said suction nozzle orifice and said surrounding air blast nozzle orifice, said means comprising a first inclined wall extending upwardly and outwardly from said suction nozzle orifice, a second inclined wall extending upwardly and outwardly from a location spaced outwardly from said suction nozzle orifice, and a curved wall interconnecting said inclined walls at their upper ends, said inclined and curved walls closing said annular space at the top and sides thereof and leaving it open at the bottom to form a vortex chamber.

10. A suction and blast nozzle unit for cleaning streets and other surfaces by suction and air blast as claimed in claim 9, in which said inclined walls have their lower ends at the same level.

11. A suction and blast nozzle unit for cleaning streets and other surfaces by suction and air blast as claimed in claim 9, in which said first inclined wall is at a greater angle to the vertical than said second inclined wall.

12. A suction and blast nozzle unit for cleaning streets and other surfaces by suction and air blasts as claimed in claim 9, in which said first inclined wall is joined to said suction nozzle along a curved line.

13. A suction cleaning device comprising, a nozzle unit having a vertical suction nozzle terminating in an orifice adjacent to the surface to be cleaned, an air blast nozzle having an orifice encircling said suction nozzle and spaced therefrom, a vortex chamber between said air blast nozzle and said suction nozzle defined by a wall flaring upwardly and outwardly from said suction nozzle orifice to said blast nozzle and then downwardly to said air blast nozzle orifice, said air blast nozzle inclining inwardly towards said suction nozzle orifice to direct a blast of air in the form of a veil obliquely towards said suction nozzle orifice.

References Cited in the file of this patent

UNITED STATES PATENTS

| 1,211,902 | Warner | Jan. 9, 1917 |
| 2,064,344 | Good | Dec. 15, 1936 |

FOREIGN PATENTS

| 732,972 | Great Britain | July 6, 1955 |